(12) United States Patent
Adams et al.

(10) Patent No.: US 8,674,686 B2
(45) Date of Patent: Mar. 18, 2014

(54) ANGULAR POSITION SENSOR FOR A ROTATING SHAFT

(75) Inventors: John Adams, Tudela (ES); Carlos Forniés, Tudela (ES); Cesar Bueno, Tudela (ES)

(73) Assignee: Piher Sensors & Controls S.A., Tudela (Navarra) (ES)

( * ) Notice: Subject to any disclaimer, the term of this patent is extended or adjusted under 35 U.S.C. 154(b) by 961 days.

(21) Appl. No.: 12/613,882

(22) Filed: Nov. 6, 2009

(65) Prior Publication Data
US 2010/0117633 A1 May 13, 2010

(30) Foreign Application Priority Data
Nov. 7, 2008 (ES) .................. 200802287 U

(51) Int. Cl.
G01B 7/30 (2006.01)
(52) U.S. Cl.
USPC .................. 324/207.25; 324/207.21
(58) Field of Classification Search
USPC .................... 324/207.25
See application file for complete search history.

(56) References Cited

U.S. PATENT DOCUMENTS

| | | | |
|---|---|---|---|
| 6,188,216 B1 | 2/2001 | Fromer | |
| 6,323,643 B1* | 11/2001 | Kordecki | 324/207.2 |
| 6,788,048 B2* | 9/2004 | Hedayat et al. | 324/207.25 |
| 7,378,842 B2 | 5/2008 | Babin | |
| 7,378,848 B2 | 5/2008 | Gao et al. | |
| 7,592,800 B2* | 9/2009 | Carlson et al. | 324/207.25 |
| 8,164,327 B2* | 4/2012 | Hoskins et al. | 324/207.2 |
| 2003/0080732 A1* | 5/2003 | Okazaki et al. | 324/207.2 |
| 2004/0100252 A1* | 5/2004 | Babin | 324/207.2 |
| 2006/0220638 A1* | 10/2006 | Urquidi et al. | 324/207.25 |
| 2008/0063330 A1* | 3/2008 | Orlowski et al. | 384/448 |

FOREIGN PATENT DOCUMENTS

EP 1 850 094 A2 10/2007
WO WO 2007/057563 A1 5/2007

* cited by examiner

Primary Examiner — Jermele M Hollington
Assistant Examiner — David M. Schindler
(74) Attorney, Agent, or Firm — RatnerPrestia

(57) ABSTRACT

The angular position sensor is for assembly on a rotating shaft rotationally guided in a support structure, and includes an annular member having an inner surface socketed on the rotating shaft without relative rotation therebetween, and a housing in which a permanent magnet is inserted. A support is provided having a through hole through which the rotating shaft and the annular member extend, the through hole having an inner surface opposite and close to the annular member with a radial allowance, a cavity housing a sensor device capable of detecting variations in the magnetic field caused by the permanent magnet upon rotating with respect to the support together with the annular member, and an anchoring configuration by which the support is secured to a fixed structure.

10 Claims, 6 Drawing Sheets

ANGULAR POSITION SENSOR FOR A ROTATING SHAFT

TECHNICAL FIELD

The present invention relates to an angular position sensor for assembly on a rotating shaft guided with respect to a support structure of a mechanism, and is useful for detecting the angular position of said rotating shaft in relation to said support structure.

BACKGROUND OF THE INVENTION

Patent application EP-A-1 850 094 describes a sensor that detects the rotation of a rotating shaft and comprises an annular member adapted for coupling by socketing on the mentioned shaft, said annular member being provided with a notched configuration coupling with a pinion to which it transmits the rotation of an angular position sensing device. The sensor comprises a first cavity with a through hole housing the mentioned annular member and an adjacent second cavity in which the mentioned sensing device is arranged. In this construction an exact positioning of the annular member in relation to is the mentioned pinion must be assured in order to guarantee the operation.

U.S. Pat. No. 7,378,848 describes an angular position sensor with a through hole and two non-symmetrical polar pieces associated with a magnetic field sensor. This sensor uses a magnetic ring arranged to be coaxially coupled to a rotating shaft which, together with said magnetic ring, is inserted through a cavity of a casing of the sensor. The sensor comprises two polar pieces which extend at least partially around the magnetic ring. The features of this sensor and the number of components involve considerable complexity and the need for very precise adjustments.

U.S. Pat. No. 6,188,216 describes a non-contacting angular position sensor of a rotating shaft, which comprises a casing with a cavity housing a polar assembly formed by two semicircular magnets fixed to a bearing body which is fixed directly to the shaft and a magnetic field sensor. The features of this sensor impose the use of two magnets separated at a very precise certain distance, coupled on the bearing body, which involves constructive limitations.

DISCLOSURE OF THE INVENTION

The present invention contributes to overcoming the drawbacks of the state of the art by providing an angular position sensor device for assembly on a rotating shaft, which is rotationally guided in a support structure.

The angular position sensor of the present invention comprises an annular member with an inner surface adapted for coupling by socketing (directly or through a coaxial intermediate piece or coupling) on said rotating shaft without the possibility of relative rotation between them, and a housing in which a permanent magnet is located. The position sensor furthermore comprises a support, which is provided with a through hole through which said rotating shaft and said annular member extend, said through hole having an inner surface opposite and close to the annular member with enough radial allowance to enable its relative rotation and movements thereof in the radial directions within a tolerance range. The support furthermore integrates a cavity adjacent to the through hole, said cavity housing a sensor device capable of detecting variations in the magnetic field caused by said permanent magnet upon rotating with respect to said support together with the annular member, and at least one anchoring configuration by means of which said support is secured to a fixed structure with respect to the rotating shaft which is assembled in a duly guided manner (e.g. by means of one or more bearing boxes) in said fixed structure.

In one embodiment, the support is formed by first and second bodies attached to one another and provided with respective opposite openings which jointly define said through hole with said inner surface around the mentioned annular member and retaining configurations which cooperate with retaining surfaces of the annular member to limit its movements in the axial direction with an axial allowance within a tolerance range. Preferably, between the first body and the annular member there is arranged a first elastic gasket and/or between the second body and the annular member there is arranged a second elastic gasket to seal the mentioned allowance and to prevent any particle of dust or of any other type from being able to be housed in the allowance and prevent the relative movements between the annular member and the through hole of the support within the tolerance ranges.

With this construction, the angular position sensor of the present invention does not need to be provided with mechanical elements, such as bearings or the like, to precisely guide the rotation between the annular member and the through hole or cavity with an opening of the support, and at the same time to limit the relative shifting between them in the axial direction and the radial directions given that, since the annular member bearing the permanent magnet is fixed to the rotating shaft, for such purpose it uses the guide members provided between the rotating shaft and the support structure of the application to which structure the sensor is fixed. Thus, the angular position sensor of the present invention has a simple and cost-effective construction; however it provides precise and reliable operation.

Furthermore, the structure of the proposed position sensor determines that the sensor is a very compact and very easy to be mounted assembly, allowing its installation making use of free areas of the bearing structure of the rotating shaft to which it is coupled, which allow the sensor itself to be protected against possible impacts or blows by the mentioned structure.

BRIEF DESCRIPTION OF THE DRAWINGS

The previous and other features and advantages will be more fully understood from the following detailed description of an embodiment with reference to the attached drawings, in which.

DETAILED DESCRIPTION OF AN EMBODIMENT

The sensor of the present invention is provided for detecting the angular position of a rotating shaft in relation to a support structure of a mechanism, such as a pedal of an automobile, among others, in which the mentioned rotating shaft is suitably guided, rotationally, in said support structure.

Figure 4:
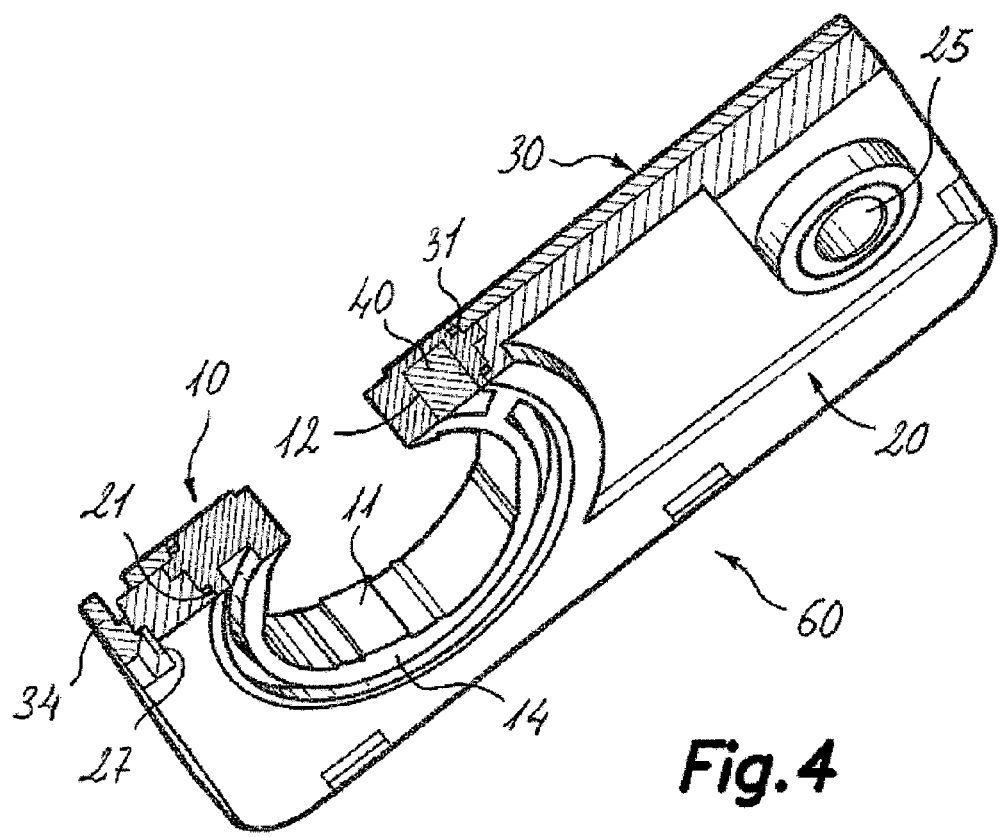
FIG. 4 is a perspective view of the sensor of FIGS. 1 and 2 sectioned through a first cutting plane.
Figure 5:
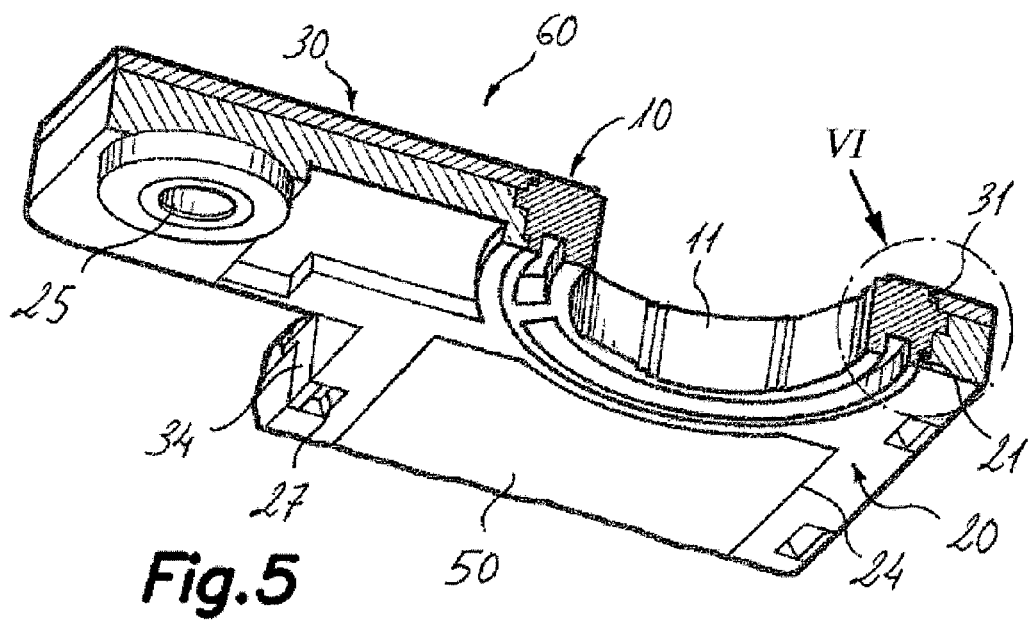
FIG. 5 is a partial perspective view of the sensor of FIGS. 1 and 2 sectioned through a second cutting plan, perpendicular to the first one.
Figure 6:
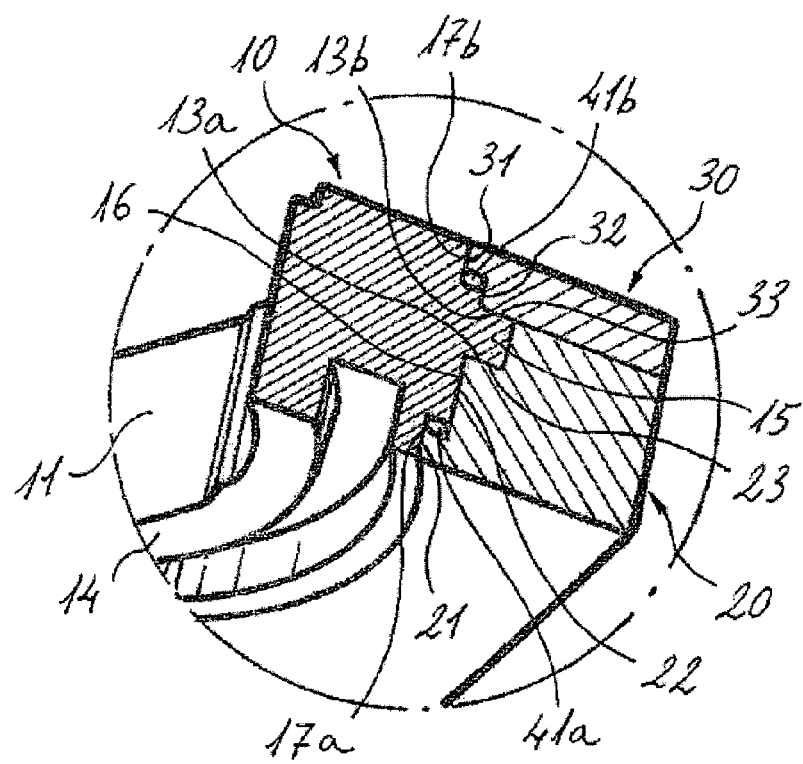
FIG. 6 is an enlarged view of detail VI of FIG. 5.

Referring to the drawings, the angular position sensor for assembly on a rotating shaft comprises, according to one embodiment of the present invention, an annular member 10 (shown separately in FIG. 3) having an inner surface 11 adapted for being coupled by socketing on said rotating shaft (not shown) without there being a possibility of relative rotation between them. The mentioned annular member 10 has a housing 12 in which a permanent magnet 40 is inserted. The sensor further comprises a support 60 provided with a through hole 21, 31 (best shown in FIGS. 4 to 6) through which the rotating shaft with the annular member 10 coupled thereto extend. This through hole 21, 31 has an inner surface 22, 32 opposite and close to the annular member 10, there being between them enough radial allowance to enable the relative rotation thereof. The support 60 has a cavity 24 adjacent to the through hole 21, 31, which houses a sensor device 50 capable of detecting variations in the magnetic field caused by said permanent magnet 40 upon rotating with respect to said support together with the annular member 10. The mentioned sensor device 50 is of a known type, such as the one described, for example, in patent application WO-A-2007/057563 or the like, and comprises at least two magneto-sensitive members and a processing circuit delivering a signal which is a function of the absolute position of the permanent magnet 40 integrated in said annular member 10. With such structure, said sensor device 50 can detect variations in the angular position of the permanent magnet 40 within a tolerance range of axial positioning and radial positioning between the permanent magnet 40 and the sensor device 50. Accordingly, the mentioned radial allowance will be within said tolerance range. The support 60 also integrates an anchoring configuration 25 through which said support 60 can be secured to said support structure (not shown), or to any other fixed structure with respect to the rotating shaft, by means of a screw or the like. Alternatively, the support 60 could have several support configurations, although one is sufficient in cooperation with the retention in the radial direction carried out by the inner surface 22, 32 of the through hole 21, 31 opposite and close to the annular member 10, which is fixed to the rotating shaft, suitably guided with respect to the mentioned support structure.

In the embodiment shown, the support 60 is formed by a first body 20 and a second body 30 acting as a cover, attached to one another, for example, by engaging by press fitting hook-ending elastic pins 34 formed in the second body 30 in corresponding coupling configurations 27 formed in the first body 20. These first and second bodies 20, 30 are provided with respective opposite openings 21, 31 which jointly define the mentioned through hole of the support 60, and said openings 21, 31 have respective inner surfaces 22, 32 which jointly define the mentioned inner surface of the through hole, which is arranged around the annular member 10. The first and second bodies 20, 30 furthermore have retaining configurations 23, 33, which cooperate with retaining surfaces 13*a*, 13*b* of the annular member 10 (FIG. 6) to limit the relative movements thereof in the axial direction with an axial allowance within the tolerance range allowable by the sensor device 50. The mentioned retaining configurations 23, 33 of the support 60 are formed in projections which extend inwardly from the respective inner surfaces 22, 32 of the first and second bodies 20, 30, and said retaining surfaces 13*a*, 13*b* of the annular member 10 are formed in a rib 15 which extends radially outwards from an outer revolution surface 16 of the annular member 10. The adjustment between the retaining configurations 23, 33 of the support 60 and the retaining surfaces 13*a*, 13*b* of the annular member 10 does not require high mechanical precision because the relative position in the axial direction is not a determining factor for the correct operation of the sensor within certain limits.

In this embodiment which is being described, between the first body 20 and the annular member 10 there is arranged a first elastic gasket 41*a*, and between the second body 30 and the annular member 10 there is arranged a second elastic gasket 41*b*. The annular member 10 has formed therein seats 17*a*, 17*b* (FIG. 6) in which there are arranged said first and second gaskets 41*a*, 41*b*, which serve to seal said radial and axial allowances between the annular member 10 and the through hole 21, 31 of the support 60 without preventing, by virtue of the elasticity thereof, certain relative movement in the axial direction and in the radial directions. The general allowance or clearance existing between the annular member 10 and the through hole 21, 31 of the support 60 can therefore be large enough to facilitate the relative rotation without needing a very precise and long-lasting mechanical adjustment between both parts. Therefore, the use of complicated and expensive mechanical solutions for guiding the rotation and precisely limiting the relative shifting in the axial direction and the radial directions between the annular member 10 and the through hole 21, 31 of the support 60 is unnecessary. For this reason, precision in the guidance of the rotating shaft with respect to the support structure of the application, which precision generally already exists due to needs of the application itself, is a determining factor for the correct operation of the sensor of the present invention. As a result, the precise guiding means of the application are not duplicated in the sensor of the present invention, and such sensor can have a significantly simpler and more cost-effective construction.

Figure 3:
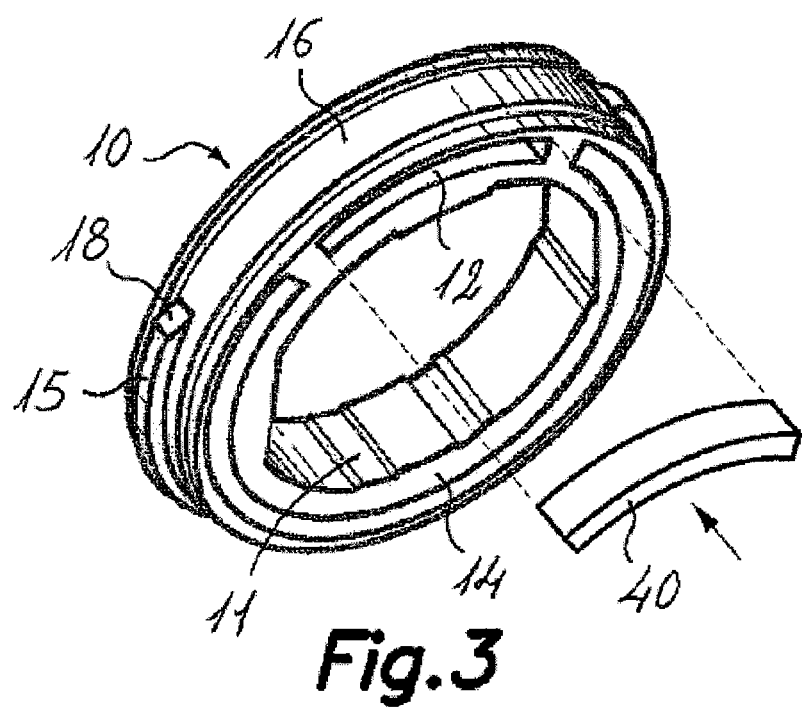
FIG. 3 is a perspective view of an annular member forming part of the sensor of FIGS. 1 and 2, with a permanent magnet about to be inserted in a housing of said annular member.

As is best shown in FIG. 3, the mentioned housing 12 of the annular member 10 has the shape of an elongated groove covering an arc in the circumferential direction. This groove is open in an end surface 14 of the annular member 10 perpendicular to the rotating shaft, such that it can receive inserted therein the permanent magnet 40 which, in accordance, has a shape complementary to that of said groove. The permanent magnet 40 can be fixed to the housing 12, for example, by interference fit or by adhesive. Alternatively, the housing 12 can comprise several grooves or a single circular groove for a permanent magnet in the form of a complete ring. The rib 15 which extends radially outwards from the outer revolution surface 16 of the annular member 10 covers an arc in the circumferential direction and has end surfaces 18 adapted for interfering with at least one stop (not shown) formed in at least one of the first and second bodies 20, 30, to limit the rotation of the annular member 10 with respect to the support 60. Alternatively, the rib 15 can cover the complete circumference and/or the stops in the support 60 can be omitted.

Figure 1:
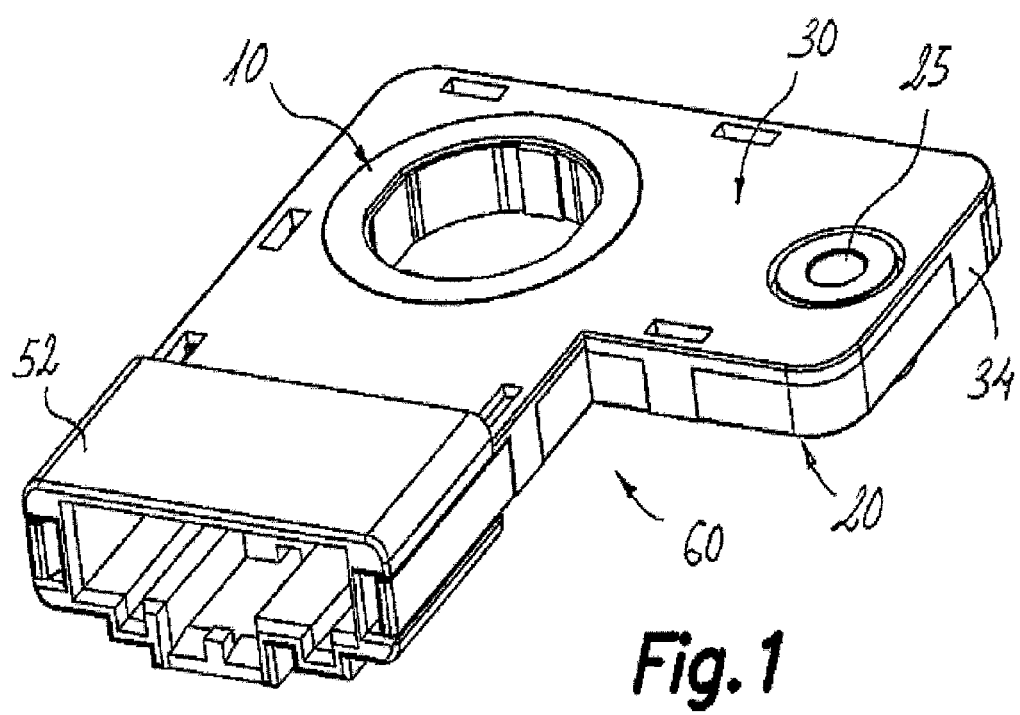
FIGS. 1 and 2 are perspective views of opposite sides of an angular position sensor for assembly on a rotating shaft according to an embodiment of the present invention.
Figure 2:
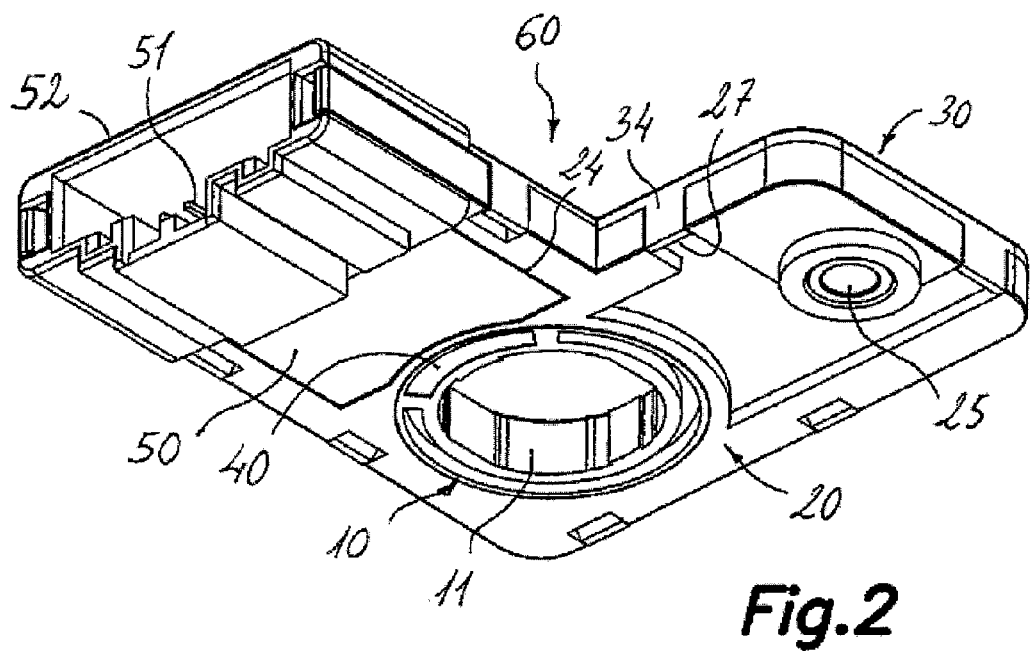

The sensor device 50, which is arranged in the mentioned cavity 24 of the support 60, has associated therewith connecting pins 51 accessible from the outside. In the embodiment shown, the cavity 24 housing the sensor device 50 is an open cavity formed in the first body 20, and said connecting pins 51 are integrated in a connector 52 (FIGS. 1 and 2) accessible from the outside. In an alternative embodiment (not shown), the cavity 24 housing the sensor device 50 is a closed cavity formed by the first and second bodies 20, 30, and the connecting pins 51 emerge out of the cavity 24 through holes formed in one or the other of the first and second bodies 20, 30. A person skilled in the art will easily devise other alternative means for the connection of the sensor device 50 without departing from the scope of the present invention.

In an alternative embodiment (not shown), the first and second bodies 20, 30 are fixed to one another by means of screws instead of by elastic pins 34 and coupling configurations 27. To that end, at least one of the first and second bodies 20, 30 has formed therein through holes opposite corresponding threaded holes formed in the other one of the first and second bodies 20, 30 for the installation therein of screws for the mutual attachment of the first and second bodies 20, 30.

A person skilled in the art will be able to make modifications and variations from the embodiment shown and described without departing from the scope of the present invention, for example by incorporating the permanent magnet 40 in the annular member 10 by a technique of overmolding of said annular member, covering the magnet, or by attaching the two bodies 20 and 30 by heat-welding or the like.

The scope of this invention is defined in the attached claims.

We claim:

1. An angular position sensor for a rotating shaft, said rotating shaft being guided rotationally in a support structure, said angular position sensor comprising:
    an annular member having an inner surface adapted to be coupled by insertion on said rotating shaft and where there is no relative rotation between them, and a housing in which a permanent magnet is inserted; and
    a support having a through hole through which said rotating shaft and said annular member extend, said through hole being surrounded by an inner surface of said support opposite and close to the annular member with enough radial allowance to enable the relative rotation and movements of the annular member in radial directions within a tolerance range,
    a cavity adjacent to the through hole, said cavity housing a sensor device capable of detecting variations in the magnetic field caused by said permanent magnet upon rotating with respect to said support together with the annular member, and
    at least one anchoring element by which said support is fixedly secured to a fixed structure,
    wherein:
    said support is formed by first and second bodies attached to one another;
    said first and second bodies having respective opposite openings which jointly define said through hole of the support;
    said openings of the first and second bodies being surrounded by respective inner surfaces of the first and second bodies which jointly define said inner surface of the support surrounding the annular member;
    said first and second bodies having respective retaining elements which cooperate with retaining surfaces of the annular member to limit its movements in axial directions with an axial allowance within a tolerance range;
    said retaining surfaces of the annular member being formed by respective surfaces of at least one rib which extends radially outward from an outer surface of the annular member; and wherein
    the annular member has formed therein seats in which first and second elastic gaskets are arranged,
    said first elastic gasket being arranged between the first body and the annular member;
    said second elastic gasket being arranged between the second body and the annular member; and
    the first and second elastic gaskets sealing said radial and axial allowances while enabling movement of the annular member in the radial and axial directions.

2. The angular position sensor according to claim 1, wherein said housing in the annular member has the shape of an elongated groove covering at least one arc in a circumferential direction, said groove being open at least in an end surface of the annular member perpendicular to the rotating shaft to receive inserted therein said permanent magnet, which has a shape complementary to that of said groove and is fixed thereto by friction fit or by adhesive.

3. The angular position sensor according to claim 1, wherein said at least one rib covers an arc in a circumferential direction and has end surfaces adapted for making contact with at least one stop formed in at least one of the first and second bodies to limit the rotation of the annular member with respect to the support.

4. The angular position sensor according to claim 1, wherein said sensor device has associated therewith connecting pins.

5. The angular position sensor according to claim 4, wherein said cavity housing the sensor device is an open cavity and said connecting pins are integrated in a connector accessible from outside the angular position sensor.

6. The angular position sensor according to claim 1, wherein said sensor device comprises at least two magneto-sensitive members and a processing circuit delivering a signal which is a function of an absolute position of the permanent magnet integrated in said annular member.

7. The angular position sensor according to claim 1, wherein one of said first and second bodies has formed therein hook-ending elastic elements and the other one of the first and second bodies has formed therein corresponding coupling elements, said hook-ending elastic elements being locked in said coupling elements for the mutual attachment of the first and second bodies.

8. The angular position sensor according to claim 1, wherein one of said first and second bodies has formed therein through holes opposite corresponding threaded holes formed in the other one of the first and second bodies for the installation therein of screws for the mutual attachment of the first and second bodies.

9. The angular position sensor according to claim 1, wherein said tolerance range is within a maximum relative movements allowable between the sensor device and the permanent magnet housed in the annular member without altering the correct operation of the sensor device.

10. The angular position sensor according to claim 1, wherein said sensor device comprises at least two magneto-sensitive members and a processing circuit delivering a signal which is a function of an absolute position of the permanent magnet integrated in said annular member.

\* \* \* \* \*